United States Patent
Amanullah et al.

(10) Patent No.: US 10,479,920 B2
(45) Date of Patent: *Nov. 19, 2019

(54) DATE TREE TRUNK AND RACHIS-BASED SUPERFINE FIBROUS MATERIALS FOR SEEPAGE LOSS CONTROL

(71) Applicant: Saudi Arabian Oil Company, Dhahran (SA)

(72) Inventors: Md Amanullah, Dhahran (SA); Jothibasu Ramasamy, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/799,004

(22) Filed: Oct. 31, 2017

(65) Prior Publication Data
US 2018/0346785 A1      Dec. 6, 2018

Related U.S. Application Data

(60) Provisional application No. 62/512,447, filed on May 30, 2017.

(51) Int. Cl.
    *C09K 8/20*     (2006.01)
    *E21B 21/00*    (2006.01)
    (Continued)

(52) U.S. Cl.
    CPC ............ *C09K 8/203* (2013.01); *C09K 8/035* (2013.01); *C09K 8/514* (2013.01); *C09K 8/516* (2013.01);
    (Continued)

(58) Field of Classification Search
    None
    See application file for complete search history.

(56) References Cited

U.S. PATENT DOCUMENTS

| 2,483,936 A | 10/1949 | Roberts |
| 2,600,404 A | 6/1952 | Hoeppel |
(Continued)

FOREIGN PATENT DOCUMENTS

| CN | 101311243 A | 11/2008 |
| CN | 101560084 A | 10/2009 |
(Continued)

OTHER PUBLICATIONS

Alsaba, M. et al. "Review of lost circulation materials and treatments with an updated classification." AADE National Technical Conference and Exhibition, Houston, TX, Apr. 2014. pp. 1-9.
(Continued)

*Primary Examiner* — John J Figueroa
(74) *Attorney, Agent, or Firm* — Bracewell LLP; Constance G. Rhebergen; Brian H. Tompkins

(57) ABSTRACT

A date tree trunk- and rachis-based lost circulation material (LCM) is provided. The date tree trunk and rachis LCM includes superfine date tree trunk fibers produced from date tree trunks and superfine date tree rachis fibers produced from date tree rachises. The date tree trunks and rachises may be obtained from the date tree waste produced by the processing of date trees in the production of date fruits. The date tree trunk and rachis LCM may include fibers having lengths in the range of about 20 microns to about 300 microns. Methods of lost circulation control using a date tree trunk and rachis LCM and manufacture of a date tree trunk and rachis LCM are also provided.

6 Claims, 2 Drawing Sheets

(51) Int. Cl.
*C09K 8/035* (2006.01)
*C09K 8/514* (2006.01)
*C09K 8/516* (2006.01)

(52) U.S. Cl.
CPC ........ *E21B 21/003* (2013.01); *C09K 2208/08* (2013.01)

(56) References Cited

U.S. PATENT DOCUMENTS

| | | | |
|---|---|---|---|
| 2,749,308 A | 6/1956 | Beckum et al. | |
| 2,779,417 A | 1/1957 | Clark, Jr. et al. | |
| 2,789,948 A | 4/1957 | Tronolone | |
| 2,811,488 A | 10/1957 | Nestle et al. | |
| 2,912,380 A | 11/1959 | Groves | |
| 2,943,679 A | 7/1960 | Scott, Jr. | |
| 2,943,680 A | 7/1960 | Scott et al. | |
| 3,147,127 A | 9/1964 | Shannon | |
| 4,086,098 A | 4/1978 | Le Ruyet et al. | |
| 4,110,225 A | 8/1978 | Cagle | |
| 4,127,548 A | 11/1978 | Alexander | |
| 4,275,788 A | 6/1981 | Sweatman | |
| 4,619,772 A | 10/1986 | Black et al. | |
| 5,004,553 A | 4/1991 | House et al. | |
| 5,118,664 A | 6/1992 | Burts, Jr. | |
| 5,197,324 A | 3/1993 | Keys | |
| 5,332,724 A | 7/1994 | Burts, Jr. | |
| 5,484,028 A | 1/1996 | Rose | |
| 5,501,275 A | 3/1996 | Card et al. | |
| 5,801,127 A | 9/1998 | Duhon, Sr. | |
| 6,016,879 A * | 1/2000 | Burts, Jr. | C09K 8/035 |
| | | | 166/295 |
| 6,098,712 A | 8/2000 | Burts, Jr. | |
| 6,102,121 A | 8/2000 | Burts, Jr. | |
| 6,271,001 B1 | 8/2001 | Clarke et al. | |
| 6,350,594 B1 | 2/2002 | Clarke et al. | |
| 6,518,224 B2 | 2/2003 | Wood | |
| 6,716,798 B1 | 4/2004 | Burts, Jr. | |
| 6,750,179 B1 | 6/2004 | Burts, Jr. | |
| 6,790,812 B2 | 9/2004 | Halliday | |
| 6,806,232 B1 | 10/2004 | Cart | |
| 6,814,798 B2 | 11/2004 | Vijn et al. | |
| 6,861,392 B2 | 3/2005 | Shaarpour | |
| 6,932,158 B2 | 8/2005 | Burts | |
| 7,226,895 B2 | 6/2007 | Xiang | |
| 7,271,131 B2 | 9/2007 | Halliday et al. | |
| 7,284,611 B2 | 10/2007 | Reddy et al. | |
| 7,297,662 B2 | 11/2007 | Verret | |
| 7,297,663 B1 | 11/2007 | Kilchrist et al. | |
| 7,332,026 B2 | 2/2008 | Fyten et al. | |
| 7,488,705 B2 | 2/2009 | Reddy et al. | |
| 7,507,692 B2 | 3/2009 | Xiang | |
| 7,537,054 B2 | 5/2009 | Reddy et al. | |
| 7,629,297 B2 | 12/2009 | Shaarpour | |
| 7,744,689 B2 | 6/2010 | Hojaji et al. | |
| 7,902,126 B1 | 3/2011 | Burts, Jr. | |
| 7,923,413 B2 | 4/2011 | Ghassemzadeh | |
| 7,964,537 B2 | 6/2011 | Rayborn, Sr. et al. | |
| 8,371,381 B2 | 2/2013 | Shindgikar et al. | |
| 8,383,558 B2 | 2/2013 | Reddy et al. | |
| 8,404,622 B2 | 3/2013 | Ghassemzadeh | |
| 8,673,825 B2 | 3/2014 | Rayborn, Sr. et al. | |
| 8,739,872 B1 | 6/2014 | Miller et al. | |
| 8,776,882 B2 | 7/2014 | Shindgikar et al. | |
| 8,887,808 B2 | 11/2014 | Kumar et al. | |
| 8,935,957 B2 | 1/2015 | Kulkarni et al. | |
| 8,992,670 B1 | 3/2015 | Vohra | |
| 9,140,118 B2 | 9/2015 | Kulkarni et al. | |
| 9,175,529 B2 | 11/2015 | Jamison et al. | |
| 9,376,607 B2 | 6/2016 | James | |
| 9,410,066 B2 | 8/2016 | Ghassemzadeh | |
| 9,416,306 B2 | 8/2016 | Savari et al. | |
| 9,453,156 B2 | 9/2016 | Wu | |
| 9,505,659 B2 | 11/2016 | Bickbau | |
| 9,592,488 B2 | 3/2017 | Yusuf et al. | |
| 9,623,067 B1 | 4/2017 | Awad et al. | |
| 9,688,901 B2 | 6/2017 | Fontenot | |
| 9,783,727 B2 | 10/2017 | Lahman et al. | |
| 2002/0010100 A1 | 1/2002 | Wood | |
| 2004/0023813 A1 | 2/2004 | Burts, III | |
| 2004/0129460 A1 | 7/2004 | MacQuoid et al. | |
| 2004/0244978 A1 | 12/2004 | Shaarpour | |
| 2005/0113260 A1 | 5/2005 | Wood | |
| 2005/0124502 A1 | 6/2005 | Shaarpour | |
| 2005/0217852 A1 | 10/2005 | Bennett et al. | |
| 2006/0106136 A1 | 5/2006 | Abu-Sharkh | |
| 2006/0122069 A1 | 6/2006 | Burts, III | |
| 2006/0157247 A1 | 7/2006 | Burts, III | |
| 2006/0160907 A1* | 7/2006 | Stamp | C05F 5/002 |
| | | | 516/100 |
| 2009/0054269 A1 | 2/2009 | Chatterji et al. | |
| 2009/0286697 A1 | 11/2009 | Shaarpour | |
| 2009/0305038 A1 | 12/2009 | Duran et al. | |
| 2009/0305911 A1 | 12/2009 | Pomerleau | |
| 2010/0152070 A1 | 6/2010 | Ghassemzadeh | |
| 2010/0181110 A1 | 7/2010 | Harr | |
| 2010/0193244 A1 | 8/2010 | Hoskins | |
| 2010/0230164 A1 | 9/2010 | Pomerleau | |
| 2010/0230169 A1 | 9/2010 | Pomerleau | |
| 2011/0214870 A1 | 9/2011 | Shaarpour | |
| 2011/0278006 A1 | 11/2011 | Sanders | |
| 2012/0157354 A1 | 6/2012 | Li et al. | |
| 2012/0247763 A1 | 10/2012 | Rakitsky et al. | |
| 2013/0025863 A1* | 1/2013 | Lin | C09K 8/5083 |
| | | | 166/294 |
| 2014/0038857 A1 | 2/2014 | Miller et al. | |
| 2014/0102987 A1 | 4/2014 | Yusuf et al. | |
| 2014/0110177 A1 | 4/2014 | Harr | |
| 2014/0135237 A1 | 5/2014 | Villarreal, Jr. et al. | |
| 2014/0209290 A1 | 7/2014 | Jamison et al. | |
| 2014/0231082 A1 | 8/2014 | Jamison et al. | |
| 2014/0262281 A1 | 9/2014 | Kulkarni et al. | |
| 2014/0318793 A1 | 10/2014 | Van Petergem et al. | |
| 2014/0353043 A1 | 12/2014 | Amanullah | |
| 2015/0051120 A1 | 2/2015 | Hurd et al. | |
| 2015/0072901 A1 | 3/2015 | Samuel et al. | |
| 2015/0166875 A1 | 6/2015 | Bird et al. | |
| 2015/0247081 A1 | 9/2015 | Dillon et al. | |
| 2015/0251156 A1 | 9/2015 | Yusuf et al. | |
| 2016/0060985 A1 | 3/2016 | Lin et al. | |
| 2016/0096988 A1 | 4/2016 | Lin et al. | |
| 2016/0177164 A1 | 6/2016 | Dillon et al. | |
| 2016/0222274 A1 | 8/2016 | Hoskins | |
| 2016/0222275 A1 | 8/2016 | Galindo et al. | |
| 2016/0257869 A1 | 9/2016 | Kulkarni et al. | |
| 2016/0264839 A1 | 9/2016 | Mata et al. | |
| 2016/0289528 A1 | 10/2016 | Wagle et al. | |
| 2016/0312100 A1 | 10/2016 | Amanullah et al. | |
| 2017/0058180 A1 | 3/2017 | Hossain et al. | |
| 2017/0137688 A1 | 5/2017 | Amanullah | |
| 2017/0166795 A1 | 6/2017 | Walker et al. | |
| 2017/0298263 A1 | 10/2017 | Amanullah | |
| 2018/0002588 A1 | 1/2018 | Amanullah | |
| 2018/0002589 A1 | 1/2018 | Amanullah | |
| 2018/0016483 A1 | 1/2018 | Amanullah | |
| 2018/0057729 A1 | 3/2018 | Amanullah | |

FOREIGN PATENT DOCUMENTS

| | | |
|---|---|---|
| CN | 101724383 A | 6/2010 |
| CN | 102127403 A | 7/2011 |
| CN | 203035080 U | 7/2013 |
| CN | 103570298 A | 2/2014 |
| CN | 103740346 A | 4/2014 |
| CN | 104087274 A | 10/2014 |
| CN | 104419392 A | 3/2015 |
| CN | 105541159 A | 5/2016 |
| GB | 2506603 A | 4/2014 |
| JP | 0671171 A | 3/1994 |
| WO | WO2004013448 A2 | 2/2004 |
| WO | 2010019535 A2 | 2/2010 |
| WO | 2010088484 A2 | 8/2010 |
| WO | 2010142370 A1 | 12/2010 |
| WO | 2012037600 A1 | 3/2012 |
| WO | 2012061187 A2 | 5/2012 |

(56) References Cited

FOREIGN PATENT DOCUMENTS

| WO | 2013039938 A1 | 3/2013 |
|---|---|---|
| WO | 2014008598 A1 | 1/2014 |
| WO | 2014197417 A1 | 12/2014 |
| WO | 2015142156 A1 | 9/2015 |
| WO | 2015199652 A1 | 12/2015 |
| WO | 2016028470 A1 | 2/2016 |
| WO | WO2016019416 A1 | 2/2016 |
| WO | 2016172287 A1 | 10/2016 |
| WO | 2017087434 A1 | 5/2017 |
| WO | 2018005575 A1 | 1/2018 |

OTHER PUBLICATIONS

Amanullah, et al.: "Application of an indigenous eco-friendly raw material as fluid loss additive", Journal of Petroleum Science and Engineering, vol. 139, (2016) pp. 191-197.
BakerHughes.com "SOLUFLAKE Flaked Calcium Carbonate" (XP055401101) Jan. 8, 2016 (1 Page).
International Search Report and Written Opinion for International Application No. PCT/US2016/062130 (SA5410/PCT); Report dated Jan. 27, 2017 (pp. 1-12).
International Search Report and Written Opinion for International Application No. PCT/US2017/039614 (SA5532/PCT); Report dated Sep. 11, 2017; pp. 1-12.
International Search Report and Written Opinion for International Application No. PCT/US2017/039616 (SA5533/PCT); Report dated Sep. 11, 2017; pp. 1-11.
Wajheeuddin, M. et al. "An experimental study on particle sizing of natural substitutes for drilling fluid applications." Journal of Nature Science and Sustainable Technology 8.2 (2014): pp. 1-14.
International Search Report and Written Opinion for International Application No. PCT/US2017/027287 (SA5508/PCT); report dated Sep. 13, 2017; 11 pages.
International Search Report and Written Opinion for International Application No. PCT/US2017/053355 (SA5580/PCT); International filing date Sep. 26, 2017; Report dated Jan. 17, 2018; pp. 1-14.
International Search Report and Written Opinion for International Application No. PCT/US2017/060079 (SA5577/PCT); International Filing Date Nov. 6, 2017; Report dated Dec. 18, 2017; pp. 1-14.
International Search Report and Written Opinion for International Application No. PCT/US2017/067179 (SA5600/PCT) International Filing Date Dec. 19, 2017; Report dated Feb. 21, 2018; pp. 1-14.
Amanullah "Characteristics, behavior and performance of ARC Plug—A date seed-based sized particulate LCM." SPE Kingdom of Saudi Arabia Annual Technical Symposium and Exhibition. Society of Petroleum Engineers, 2016. (pp. 1-9).
International Search Report and Written Opinion for PCT/US2017/047877 (SA5599/PCT); Report dated Oct. 27, 2017; 15 pages.
Alawad, Musaed N.J., et al.; "Superior fracture-seal material using crushed date palm seeds for oil and gas well drilling operations" Journal of King Saud University—Engineering Sciences (2017); pp. 1-7.
Al-Awad, Musaed NJ et al.; "Utilization of Shredded Waste Car Tyres as a Fracture Seal Material (FSM) in Oil and Gas Drilling Operations" Journal of Petroleum & Environmental Biotechnology, (2017) vol. 8, Issue 2; pp. 1-4.
International Search Report and Written Opinion for International Application No. PCT/US2018/034291 (SA5652/PCT); International Filing Date May 24, 2018; Report dated Jul. 31, 2018 (pp. 1-11).
Saudi Aramco "Local pal trees support technical solutions" Dhahran, Aug. 4, 2015; available as of Sep. 19, 2018 at the website: www.saudiaramco.com/en/home/news-media/news/local-palm-trees-support.html.
International Search Report and Written Opinion for International Application No. PCT/US2017/041611 (SA5534); International Filing Date Jul. 12, 2017; Report dated Oct. 27, 2017 (pp. 1-15).
International Search Report and Written Opinion for International Application No. PCT/US2018/048423 (SA5757); International Filing Date Aug. 29, 2018; Report dated Nov. 29, 2018 (pp. 1-12).
"Wood Shop News, Issue #08 Hard and softwoods, a unique food bank, and more news from around the shop" available as of Oct. 8, 2018 at the website: https://www.wooden-box-maker.com/Wood_Shop_News-hardwoods-and-softwoods.html.

* cited by examiner

US 10,479,920 B2

DATE TREE TRUNK AND RACHIS-BASED SUPERFINE FIBROUS MATERIALS FOR SEEPAGE LOSS CONTROL

CROSS-REFERENCE TO RELATED APPLICATIONS

This application claims priority from U.S. Provisional Application No. 62/512,447 filed May 30, 2017, and titled "DATE TREE TRUNK AND RACHIS-BASED SUPERFINE FIBROUS MATERIALS FOR SEEPAGE LOSS CONTROL." For purposes of United States patent practice, this application incorporates the contents of the Provisional application by reference in its entirety.

BACKGROUND

Field of the Disclosure

The present disclosure generally relates to controlling lost circulation in a wellbore, such as during drilling with a drilling fluid. More specifically, embodiments of the disclosure relate to a lost circulation material (LCM).

Description of the Related Art

Lost circulation is one of the frequent challenges encountered during drilling operations. Lost circulation can be encountered during any stage of operations and occurs when drilling fluid (such as drilling mud) pumped into a well returns partially or does not fully return to the surface. While some fluid loss is expected, excessive fluid loss is not desirable from a safety, an economical, or an environmental point of view. Lost circulation is one of the major causes of non-productive time (NPT) and is associated with problems with well control, borehole instability, pipe sticking, unsuccessful production tests, and poor hydrocarbon production after well completion.

Lost circulation can occur in various formations, such as naturally fractured formations, cavernous formations, and high permeable formations. Lost circulation can be categorized by the amount of fluid or mud lost as seepage type, moderate type, severe type, and total loss. The extent of the fluid loss and the ability to control the lost circulation with an LCM depends on the type of formation in which the lost circulation occurs. For example, high permeable, super-K (for example, having an extremely high permeability of greater than 500 millidarcy), fractured, vugular, and cavernous formations may lost a large volume of drilling mud and experience a rapid drop of mud column in the wellbore. The rapid drop of mud column may lead to various drilling problems such as stuck pipe, wellbore instability, and kicks or blowouts that may result in side tracking or abandonment of a well.

SUMMARY

Lost circulation materials (LCMs) are used to mitigate the lost circulation by blocking the path of the drilling fluid (such as drilling mud) into the formation. The type of LCM used in a lost circulation situation depends on the extent of lost circulation and the type of formation. LCMs used to control lost circulation may be divided into six general categories: fibrous materials, flaky materials, granular materials, gel-type materials, crosslinking polymers, and loss control slurries. Some LCM products may have a range of grades referred to as extra-large, large, coarse, medium, fine, and superfine. Fine and superfine grade LCMs may be used for seepage-type lost circulation, and may be combined in a pill or a loss control slurry.

Costs incurred in loss circulation situations may be due to losses of drilling fluids, losses of production, and the costs of LCMs, including importation of LCMs to drilling locations. For example, the importation of LCMs to address seepage-type lost circulation may increase the cost of drilling and production in formations susceptible to seepage-type lost circulation. Seepage-type loss zones typically experience losses of 10-15 barrels (bbls) of whole mud. LCMs may be targeted to control different types of mud losses; however, very few existing LCMs are applicable to seepage-type loss zones. Moreover, most of the existing LCMs for use in seepage-type loss zones are chemicals and polymers that need crosslinkers to be effective and require special placement techniques to deliver into the loss zone. Such chemical and polymer LCMs, and the associated crosslinkers, are not environmentally friendly and may have a negative impact on the surrounding environment of a wellsite.

Embodiments of the disclosure include a date tree trunk- and rachis-based LCM formed from date tree trunk fibers produced from date tree trunks and date tree rachis fibers produced from date tree rachises. In one embodiment, a method to control lost circulation in a lost circulation zone in a wellbore is provided. The method includes introducing an altered drilling fluid into the wellbore such that the altered drilling fluid contacts the lost circulation zone and reduces a rate of lost circulation into the lost circulation zone, where the altered drilling fluid includes a drilling fluid and a lost circulation material (LCM). The LCM includes a plurality of date tree trunk fibers produced from date tree trunks and a plurality of date tree rachis fibers produced from date tree rachises, each of the plurality of date tree trunk fibers and the plurality of date tree rachis fibers having a length in the range of about 20 microns ($\mu m$) to about 300 $\mu m$.

In some embodiments, the altered drilling fluid consists of the drilling fluid and the LCM. In some embodiments, the LCM consists of the plurality of date tree trunk fibers and the plurality of date tree rachis fibers. In some embodiments, the plurality of date tree trunk fibers include a plurality of untreated date tree trunk fibers and the plurality of date tree rachis fibers include a plurality of untreated date tree rachis fibers. In some embodiments, the plurality of date tree trunk fibers and plurality of date tree rachis fibers are in an amount in the range of 1% to 3% by weight of the total weight (w/w %) of the altered drilling fluid. In some embodiments, the reduced rate of lost circulation of a fluid portion of the altered drilling fluid is zero. In some embodiments, the drilling fluid includes a low solid non-dispersed mud.

In another embodiment, an altered drilling fluid is provided that includes a drilling fluid and a lost circulation material (LCM) having a plurality of date tree trunk fibers produced from date tree trunks and a plurality of date tree rachis fibers produced from date tree rachises. Each of the plurality of date tree trunk fibers and the plurality of date tree rachis fibers has a length in the range of about 20 microns ($\mu m$) to about 300 $\mu m$. In some embodiments, the altered drilling fluid consists of the drilling fluid and the LCM. In some embodiments, the LCM consists of the plurality of date tree trunk fibers and the plurality of date tree rachis fibers. In some embodiments, the plurality of date tree trunk fibers include a plurality of untreated date tree trunk fibers and the plurality of date tree rachis fibers include a plurality of untreated date tree rachis fibers. In some embodiments, the plurality of date tree trunk fibers and the plurality of date tree rachis fibers are in an amount in the range of 1% to 3% by weight of the total weight of the altered drilling fluid.

In another embodiment, a method of forming a lost circulation material (LCM). The method includes chopping a plurality of date tree trunks to produce a plurality of chopped date tree trunks, chopping a plurality of date tree rachis to produce a plurality of chopped date tree rachis, and grinding the chopped date tree trunks and chopped date tree rachis to produce a plurality of fibers having a length in the range of about 20 microns (μm) to about 300 μm, such that the LCM includes the plurality of fibers. In some embodiments, the method includes washing the plurality of date tree trunks before chopping the date tree trunks and washing the plurality of date tree rachis before chopping the date tree rachis. In some embodiments, the method includes sieving the ground date tree trunks and date tree rachis using one or more sieves to produce the plurality of fibers each having a length in the range of about 20 microns (μm) to about 300 μm. In some embodiments, the plurality of date tree trunks include a plurality of untreated date tree trunks and the plurality of date tree rachis include a plurality of untreated date tree rachis.

In another embodiments, a lost circulation material (LCM) composition is provided. The LCM composition includes a plurality of fibers formed from a plurality of date tree trunks and a plurality of date tree rachis, the plurality of fibers having a length in the range of about 20 microns (μall) to about 300 μm, such that the plurality of fibers are formed by grinding the plurality of date tree trunks and the plurality of date tree rachis.

DETAILED DESCRIPTION

Figure 1:
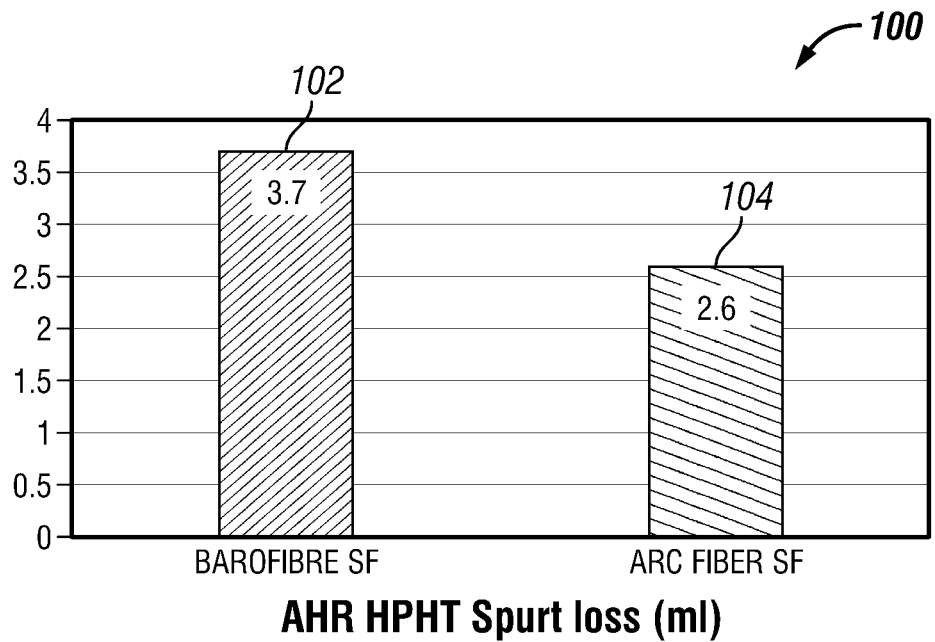
FIG. 1 is a bar graph of the spurt loss of an low solid non-dispersed mud (LSND) mud during an high pressure-high temperature (HPHT) filtration test using an example date tree trunk and rachis LCM and a commercially available LCM in accordance with embodiments of the disclosure.

The present disclosure will now be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

As a wellbore is drilled, a drilling fluid is continuously pumped into the wellbore to clear and clean the wellbore and the filings. The drilling fluid is pumped from a mud pit into the wellbore and returns again to the surface. A lost circulation zone is encountered when the flow rate of the drilling fluid that returns to the surface is less than the flow rate of the drilling fluid pumped into the wellbore, and it is this reduction or absence of returning drilling fluid that is referred to as lost circulation.

Embodiments of the disclosure include a date tree trunk and rachis LCM that includes superfine (for example, 300 microns or less) fibers formed from the trunks and rachises of date trees. The date tree trunk and rachis LCM may be introduced into a lost circulation zone in a well to mitigate or prevent lost circulation, and to additionally provide seepage control and minimize or prevent fluid loss. The date tree trunks and rachises may be obtained from date tree waste produced by the processing of date trees (also referred to as "date palms") in the production of date fruits (also referred to as "dates"). In some embodiments, the date tree trunk and rachis LCM includes fibers having lengths in the range of about 20 microns (μm) to about 300 microns.

As described in the disclosure, the date tree trunk and rachis LCM may be added to a drilling fluid to control (that is, mitigate or prevent) seepage type lost circulation while drilling loss zones in highly permeable and porous formations, such as formations having a permeability in the range of about 10 Darcy to about 25 Darcy. The date tree trunk and rachis fibers having the disclosed sizes and properties may enable the date tree trunk and rachis LCM to provide highly stable flow barriers to mitigate or prevent the loss of whole mud while drilling or the loss of cement slurry while cementing a well. For example, the fibers at the mouth of fractures and gaps in a loss zone, within narrow spaces of the fractures and gaps of the loss zone, or both, and may develop a seal, plug, or other structure in the fractures and gaps to prevent or reduce the loss of drilling fluid.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting example of a date tree trunk and rachis LCM was prepared and evaluated against a commercially available LCM using a low solid non-dispersed mud (LSND). High pressure-high temperature (HPHT) filtration tests were conducted on the date tree trunk and rachis LCM and the commercially available LCM using and an HPHT Filter Press manufactured by OFI Testing Equipment, Inc., of Houston, Tex., USA. The tests were conducted at a pressure of about 500 psi and a temperature of about 100° C. For the HPHT filtration tests, the date tree trunk and rachis LCM and commercially available LCM were incorporated into a LSND mud having the composition shown in Table 1:

TABLE 1

COMPOSITION OF LSND MUD

| Mud Components | LSND mud |
|---|---|
| Water (milliliters (ml)) | 332 |
| Bentonite (grams (g)) | 6 |
| XC Polymer (g) | 1 |
| Soda Ash (g) | 0.3 |
| Potassium Chloride (g) | 20 |
| Sodium Sulfite (g) | 1 |
| Sodium Hydroxide | Amount sufficient to raise pH in the range of about 9.5 to about 10 |

The example date tree trunk and rachis LCM was formed from superfine fibers from processed date tree trunks and date tree rachises. Sieve analysis was performed on the fibers, and the size distribution from the sieve analysis is shown in Table 2:

TABLE 2

SIZE DISTRIBUTION OF EXAMPLE SUPERFINE DATE TREE LCM FIBERS

| Sieve Size | Sieve Size (microns) | Empty Sieve Weigh (g) | Sieve + Sample weigh (g) | Sample Weigh (g) | Amount (%) |
|---|---|---|---|---|---|
| Passed on 300 μm Sieve | 300 | 362.31 | 365.20 | 2.89 | 3.09 |
| Retained on 250 μm Sieve | 250 | 347.90 | 348.89 | 0.99 | 1.06 |
| Retained on 150 μm Sieve | 150 | 333.75 | 339.30 | 5.55 | 5.93 |
| Retained on 106 μm Sieve | 106 | 329.49 | 336.51 | 7.02 | 7.50 |
| Retained on 75 μm sieve | 75 | 321.46 | 377.20 | 55.74 | 59.59 |
| Retained on 32 μm sieve | 32 | 314.70 | 334.50 | 19.80 | 21.17 |
| Retained on 20 μm sieve | 20 | 306.45 | 308.00 | 1.55 | 1.66 |
| Retained on Blank | >20 | 356.32 | 356.32 | 0.00 | 0.00 |
| Total weight before sieving (g) | | 97 | | | |
| Total weight after sieving (g) | | 93.54 | | | |

A HPHT filtration test was conducted by incorporating 10 g of the example date tree trunk and rachis LCM in the LSND mud. A second HPHT filtration test was conducted by incorporating 10 g of Barofibre® SF manufactured by The Halliburton Company of Houston, Tex., USA. The HPHT filtration tests were conducted at about 212° F. and about 500 pounds per square inch (psi) differential pressure. The LSND mud was hot rolled for about 16 hours at the test conditions of about 212° F. and about 500 psi.

FIG. 1 is a bar graph 100 of the spurt loss (in ml) exhibited by the example date tree trunk and rachis LCM and the commercial LCM after hot rolling (AHR) and testing with an HPHT filter press. The bar graph 100 illustrates the spurt loss control of the two LCMs. FIG. 1 depicts a first bar 102 corresponding to the example date tree trunk and rachis LCM and a second bar 104 corresponding to the commercially available LCM Barofibre® SF. As shown in FIG. 1, the example date tree trunk and rachis LCM exhibited lower spurt loss as compared to the commercial LCM. The HPHT filtration test thus shows that the date tree trunk and rachis LCM has improved spurt loss performance relative to the commercial LCM.

Figure 2:
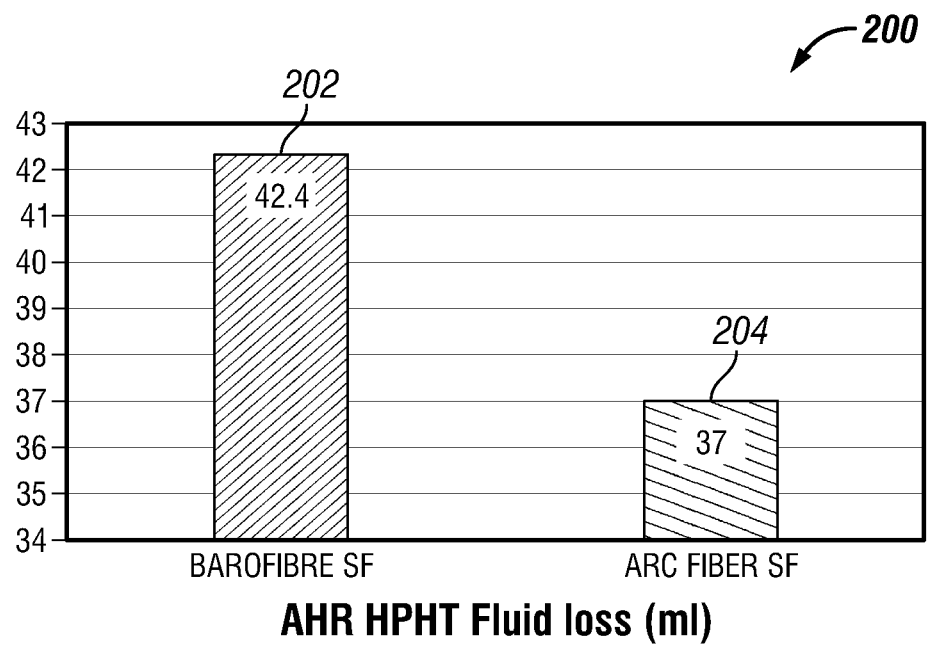
FIG. 2 is a bar graph of the fluid loss of an LSND mud during an high pressure-high temperature (HPHT) filtration test using an example date tree trunk and rachis LCM and a commercially available LCM in accordance with embodiments of the disclosure.

FIG. 2 is a bar graph 200 of the fluid loss (in ml) exhibited by the example date tree trunk and rachis LCM and the commercial LCM and illustrates the fluid loss control performance of the two LCMs. FIG. 2 accordingly depicts a first bar 202 corresponding to the example date tree trunk and rachis LCM and a second bar 204 corresponding to the commercial LCM. As shown in FIG. 2, the example date tree trunk and rachis LCM exhibited a lower fluid loss as compared to the commercial LCM during the HPHT filtration test. The HPHT filtration test thus shows that the date tree trunk and rachis LCM has improved fluid loss performance relative to the commercial LCM.

Figure 3:
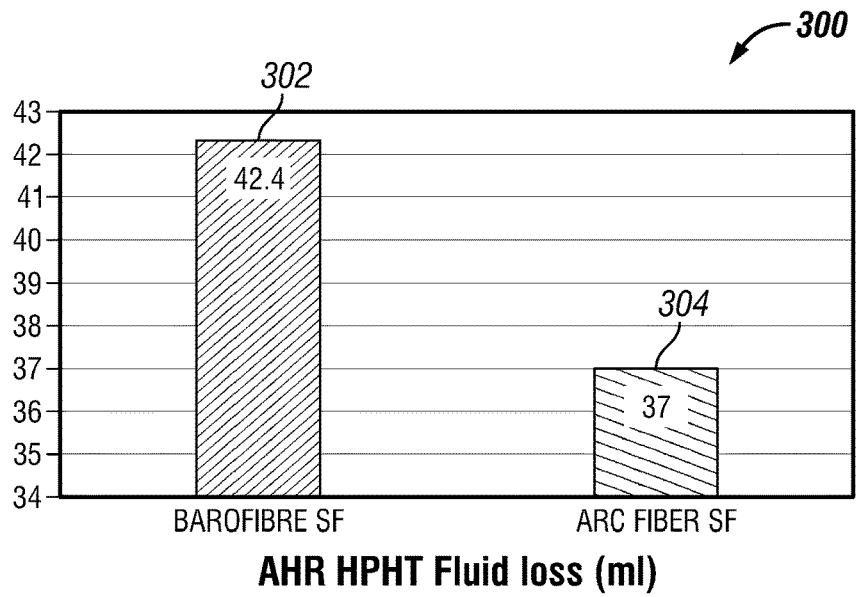
FIG. 3 is a bar graph of the mudcake thickness formed by an LSND mud during an high pressure-high temperature (HPHT) filtration test using an example date tree trunk and rachis LCM and a commercially available LCM in accordance with embodiments of the disclosure.

FIG. 3 is a bar graph 300 of the mudcake thickness (in mm) formed after the HPHT filtration test for the example date tree trunk and rachis LCM and the commercial LCM. FIG. 3 accordingly depicts a first bar 302 corresponding to the example date tree trunk and rachis LCM and a second bar 304 corresponding to the commercial LCM. As shown in FIG. 3, the example date tree trunk and rachis LCM formed a thinner mudcake as compared to the mudcake formed using the commercial LCM during the HPHT filtration test. The formation of the thinner mudcake during the HPHT filtration test thus shows that the date tree trunk and rachis LCM has improved capability to mitigate or prevent fluid loss relative to the commercial LCM.

As shown in the results from the HPHT tests depicted in FIGS. 1-3, the date tree trunk and rachis LCM may provide improved control of seepage type loss of drilling mud as compared to the commercially available LCM Barofibre® SF and, consequently, other commercially available LCMs. The date tree trunk and rachis LCM may thus be a viable alternative to the tested commercially available LCM and other similar commercial LCMs used for seepage type loss control.

Date Tree Trunk and Rachis LCM Manufacture and Use

In some embodiments, a date tree trunk and rachis LCM includes date tree fibers formed from date tree trunks and date tree fibers formed from date tree rachises. The date tree trunks and rachises may be produced as a waste by-product from date processing. For example, the date tree trunks and rachises may be obtained from date processing plants to provide a sustainable source of material for the date tree trunk and rachis LCM. Moreover, local sources of date tree trunks and rachises may reduce the cost of imported LCM products, components, or both. In some embodiments, the date tree trunks and rachises are obtained from the species *Phoenix dactylifera*. It should be appreciated that, in some embodiments, the date tree trunks and rachises may be obtained from genetically modified date trees (that is, genetically modified organisms (GMOs)). In some embodiments, the date tree trunks and rachises may be prepared by cleaning the date tree trunks before processing and use as an LCM, such as by washing the date tree trunks.

In some embodiments, the date tree trunk and rachis LCM includes fibers having lengths of 300 μm or less. In some embodiments, the date tree trunk and rachis may a combination of fibers having one or more of the following size ranges: less than 300 μm and greater than 250 μm; greater than 150 μm and less than 251 μm; greater than 106 μm and less than 151 μm; greater than 75 μm and less than 107 μm; greater than 32 μm and less than 76 μm; and greater than 20 μm and less than 33 μm.

In some embodiments, the date tree trunks may include untreated date tree trunks and the date tree rachis may include untreated date tree rachises, thus preserving the environmentally-friendly and biodegradable properties of the manufacturing process, the fibers formed from the date tree trunks and rachises, and the resulting LCM composition. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the fibers. In such embodiments, the date tree trunk and rachis LCM may be manufactured without treating before, during, or after crushing, grinding, drying, or any other processing to form untreated fibers from the date tree trunks and rachises.

In some embodiments, the date tree trunk and rachis LCM may be added directly to a drilling fluid, such as a drilling mud, to create an altered drilling fluid having the date tree trunk and rachis LCM. For example, in some embodiments, the date tree trunk and rachis LCM may be added to (for example, blended with) an oil-based drilling mud or a water-based drilling mud. In some embodiments, the date tree trunk and rachis LCM may be added to a drilling fluid in an amount in the range of 1% by weight of the total weight (w/w %) to about 3 w/w %. In some embodiments, the date tree trunk and rachis LCM may be added at the mud pit of a mud system. After addition of the date tree trunk and rachis LCM to a drilling fluid, the altered drilling fluid may be circulated at a pump rate effective to position the altered drilling fluid into contact with a lost circulation zone in a wellbore, such that the date tree trunk and rachis LCM alters the lost circulation zone (for example, by entering and blocking porous and permeable paths, cracks, and fractures in a formation in the lost circulation zone, such as by forming a structure in a mouth or within a fracture).

Figure 4:
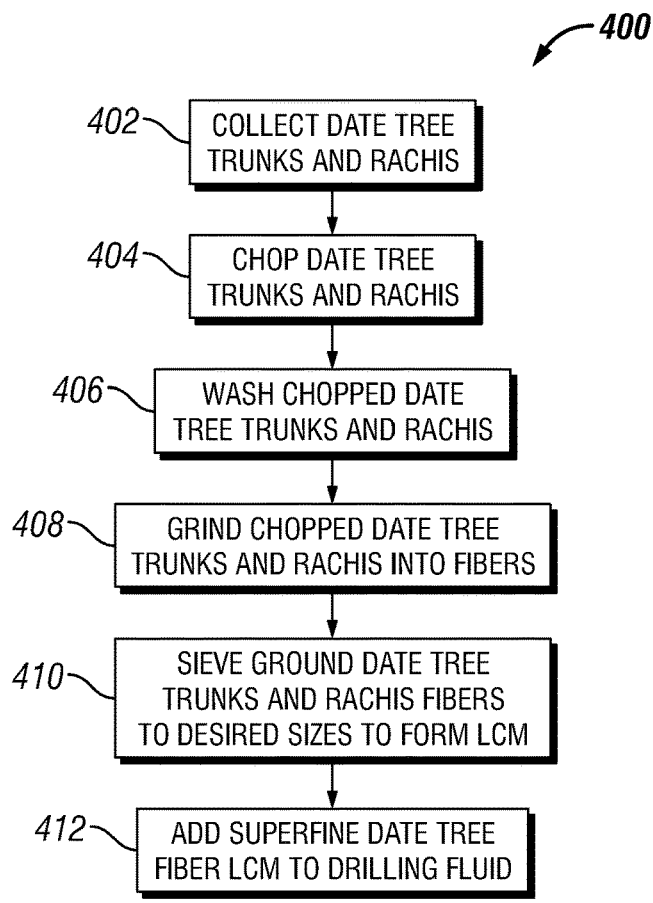
FIG. 4 is a block diagram of a process for manufacturing and using a date tree trunk and rachis LCM in accordance with embodiments of the disclosure

FIG. 4 depicts a process 400 for the production and use of a date tree and rachis LCM in accordance with an example embodiment of the disclosure. As shown in FIG. 4, date tree trunks and rachises may be collected (block 402) from deceased date trees, such as from a date processing facility. In some embodiments, date tree trunks and rachises may be collected from a date processing facility and transported to another facility for the processing described in the disclosure. Next, the date tree trunks and rachises may be chopped into smaller pieces (block 404). For example, the date tree trunks may be chopped for subsequent ease of handling. In some embodiments, the date tree trunks may be chopped manually using a suitable chopping tool. In other embodiments, the date tree trunks may be chopped automatically via a suitable machine, such as an industrial chopper.

Next, the chopped date tree trunks and rachises may be cleaned and washed (block 406) to remove dirt, dust, and other foreign substances. In some embodiments the chopped date tree trunks and rachises may be washed using a high pressure water jet to remove dirt, dust, and other foreign substances. The chopped date tree trunks and rachises may then be ground to produce date tree trunk and rachis fibers (block 408). In some embodiments, the chopped date tree trunk and rachis may be ground using a suitable commercial grinder that produces a specific range of fiber sizes (for example, length and diameter). For example, a suitable commercial grinder may be capable of grinding the chopped date trunks and rachises into fibers having lengths of about 300 μm or less. In some embodiments, the date tree trunk and rachis fibers may be ground in stages. For example, the chopped date tree trunks and rachises may be ground using a primary grinding process or grinder to produce a first range of fiber sizes. The ground date tree trunks and rachises may then be ground using a secondary grinding process or grinder to produce a second range of fiber sizes for use in the date tree trunk and rachis LCM. The chopped date tree trunk and rachis fibers may be ground to sizes of 300 300 μm of less. For example, in some embodiments, the chopped date tree trunk and rachis fibers may be ground to produce the following sizes some embodiments, the date tree trunk and rachis LCM: less than 300 μm and greater than 250 μm; greater than 150 μm and less than 251 μm; greater than 106 μm and less than 151 μm; greater than 75 μm and less than 107 μm; greater than 32 μm and less than 76 μm; and greater than 20 μm and less than 33 μm.

The ground date tree trunk and rachis fibers may then be sieved to obtain desired fibers sizes for the date tree trunk and rachis LCM (block 410). In some embodiments, the date tree trunk fibers may be packed for transportation and use, such as in in paper bags. In some embodiments, the date tree trunk fibers may be dried using a sun drying process over a time period in atmospheric conditions. In some embodiments, a suitable amount of packed date tree trunk fibers may then be transported to an oil and gas operations site for use as a date tree trunk LCM.

As shown in FIG. 4, the date tree trunk and rachis LCM may be added directly to a drilling fluid (block 412), such as a drilling mud, to create an altered drilling fluid having the date tree trunk LCM. For example, in some embodiments, the date tree trunk and rachis LCM may be added to (for example, blended with) an oil-based drilling mud or a water-based drilling mud. In some embodiments, the date tree trunk and rachis LCM may be added at the mud pit of a mud system. After addition of the date tree trunk and rachis LCM to a drilling fluid, the altered drilling fluid may be circulated at a pump rate effective to position the drilling fluid into contact with a lost circulation zone in a wellbore, such that the date tree trunk and rachis LCM alters the lost circulation zone (for example, by entering and blocking porous and permeable paths, cracks, and fractures in a formation in the lost circulation zone). Advantageously, as discussed above, the date tree trunk and rachis LCM may be particularly suitable for mitigating or preventing seepage type lost circulation. Accordingly, the date tree trunk and rachis LCM may reduce or prevent the loss of whole mud in a lost circulation zone. As previously stated, the date tree trunk and rachis LCM may form at openings of paths, cracks, and fractures in a loss zone and within narrow spaces of the paths, cracks, and fractures.

In other embodiments, the date tree trunk and rachis LCM and one or more additional LCMs may be added to a drilling fluid, such as a drilling mud, to create an altered drilling fluid having the LCMs. For example, in some embodiments, the date tree trunk and rachis LCM and one or more additional LCMs may be added to an oil-based drilling mud or a water-based drilling mud. In other embodiments, the date tree trunk and rachis LCM may be added to a cement slurry for use in a cementing operation. In some embodiments, the date tree trunk and rachis LCM may be used as a component of an LCM blend or pill. For example, in some embodiments, the date tree trunk and rachis LCM may be mixed with a carrier fluid, a viscosifier, or both to form a homogenous suspension or pill. A specific carrier fluid, viscosifier, or combination therefor may be selected to form a homogenous suspension or pill having the date tree trunk and rachis LCM.

When added directly to a drilling fluid alone or added to a drilling fluid with one or more additional LCMs, the biodegradation properties of the superfine fibers of the date tree trunk and rachis LCM may enable the date tree trunk and rachis LCM to easily degrade and disappear from the environment over time and minimize or prevent any environmental impact. Further, the non-toxic properties and sustainable sourcing of the date tree trunk and rachis fibers may minimize or prevent any effect on ecosystems, habitats, population, crops, and plants surrounding the drilling site where the date tree trunk and rachis LCM is used. Additionally, sourcing the date tree trunk and rachis LCM from date tree waste produced from date processing may eliminate the cost associated with the importation of other LCMs.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method to control lost circulation in a lost circulation zone in a wellbore, comprising:
    introducing an altered drilling fluid into the wellbore such that the altered drilling fluid contacts the lost circulation zone and reduces a rate of lost circulation into the lost circulation zone, where the altered drilling fluid comprises a drilling fluid and a lost circulation material (LCM), wherein the drilling fluid comprises a low solid non-dispersed mud, wherein the LCM comprises:
        a plurality of date tree trunk fibers produced from date tree trunks and a plurality of date tree rachis fibers produced from date tree rachises, each of the plurality of date tree trunk fibers and the plurality of date tree rachis fibers having a length in the range of about 20 microns ($\mu$m) to about 300 $\mu$m.

2. The method of claim 1, wherein the altered drilling fluid consists of the drilling fluid and the LCM.

3. The method of claim 1, wherein the LCM consists of the plurality of date tree trunk fibers and the plurality of date tree rachis fibers.

4. The method of claim 1, wherein the plurality of date tree trunk fibers comprise a plurality of untreated date tree trunk fibers and the plurality of date tree rachis fibers comprise a plurality of untreated date tree rachis fibers.

5. The method of claim 1, wherein the plurality of date tree trunk fibers and the plurality of date tree rachis fibers comprise a total amount in the range of 1% to 3% by weight of the total weight of the altered drilling fluid.

6. The method of claim 1, wherein the reduced rate of lost circulation of a fluid portion of the altered drilling fluid is zero.

* * * * *